United States Patent [19]

Blomstrom et al.

[11] 3,800,901

[45] Apr. 2, 1974

[54] FINAL DRIVE DECOUPLING AND PARKING BRAKE ARRANGEMENT FOR HYDROSTATIC LOADER

[75] Inventors: Gary D. Blomstrom, Sugar Grove; Carl T. Butler, Aurora; James M. Kostas, Peoria; Czeslaw J. May, Aurora; Robert D. Nesbit, Morton; Stamos I. Papasideris, Bristol, all of Ill.

[73] Assignee: Caterpillar Tractor Co., Peoria, Ill.

[22] Filed: Dec. 23, 1971

[21] Appl. No.: 211,368

[52] U.S. Cl. ............ 180/9.62, 180/66 R, 180/70 R, 192/67 R, 192/89 A
[51] Int. Cl. ............................................. B60k 17/10
[58] Field of Search .... 180/44 M, 44 F, 44 E, 43 B, 180/66 F, 65 F, 72, 71, 70 R, 9.2, 9.62; 192/89 A, 67 R, 93 A, 97, 94

[56] References Cited
UNITED STATES PATENTS

| | | | |
|---|---|---|---|
| 3,272,276 | 9/1966 | Budzich | 180/44 M |
| 1,370,378 | 3/1921 | Starr | 180/43 B |
| 3,439,766 | 4/1969 | Dence et al. | 180/66 F |
| 2,439,941 | 3/1948 | Lounsbury | 192/89 A X |
| 3,246,715 | 4/1966 | Pool et al. | 180/44 M |
| 3,422,917 | 1/1969 | Guinot | 180/44 F |
| 3,027,960 | 4/1962 | Ditel | 180/44 F |
| 3,480,099 | 11/1969 | Nighswonger et al. | 180/44 M |
| 1,783,780 | 12/1930 | Evans | 180/43 B |
| 2,780,333 | 2/1957 | Reiser et al. | 192/67 R |
| 3,331,482 | 7/1967 | Keramas | 192/97 |

*Primary Examiner*—Kenneth H. Betts
*Assistant Examiner*—David M. Mitchell
*Attorney, Agent, or Firm*—Fryer, Tjensvold, Phillips & Lempio

[57] ABSTRACT

A hydrostatic loader final drive wherein a hydraulic motor transmits power through a quill shaft to reduction gearing coupled to a track driving sprocket wherein means are provided to conveniently disconnect the quill shaft from the reduction gearing or the motor in situations where it is necessary to tow the vehicle with the motor inoperable, and parking and/or emergency brake means are associated with the input side of the reduction gearing to lock same when the motor is inoperable.

24 Claims, 5 Drawing Figures

INVENTORS
GARY D. BLOMSTROM
CARL T. BUTLER
JAMES M. KOSTAS
CZESLAW J. MAY
ROBERT D. NESBITT
STAMOS I. PAPASIDERIS

BY

*Fryer, Tjensvold, Feix, Phillips & Lempio*

ATTORNEYS

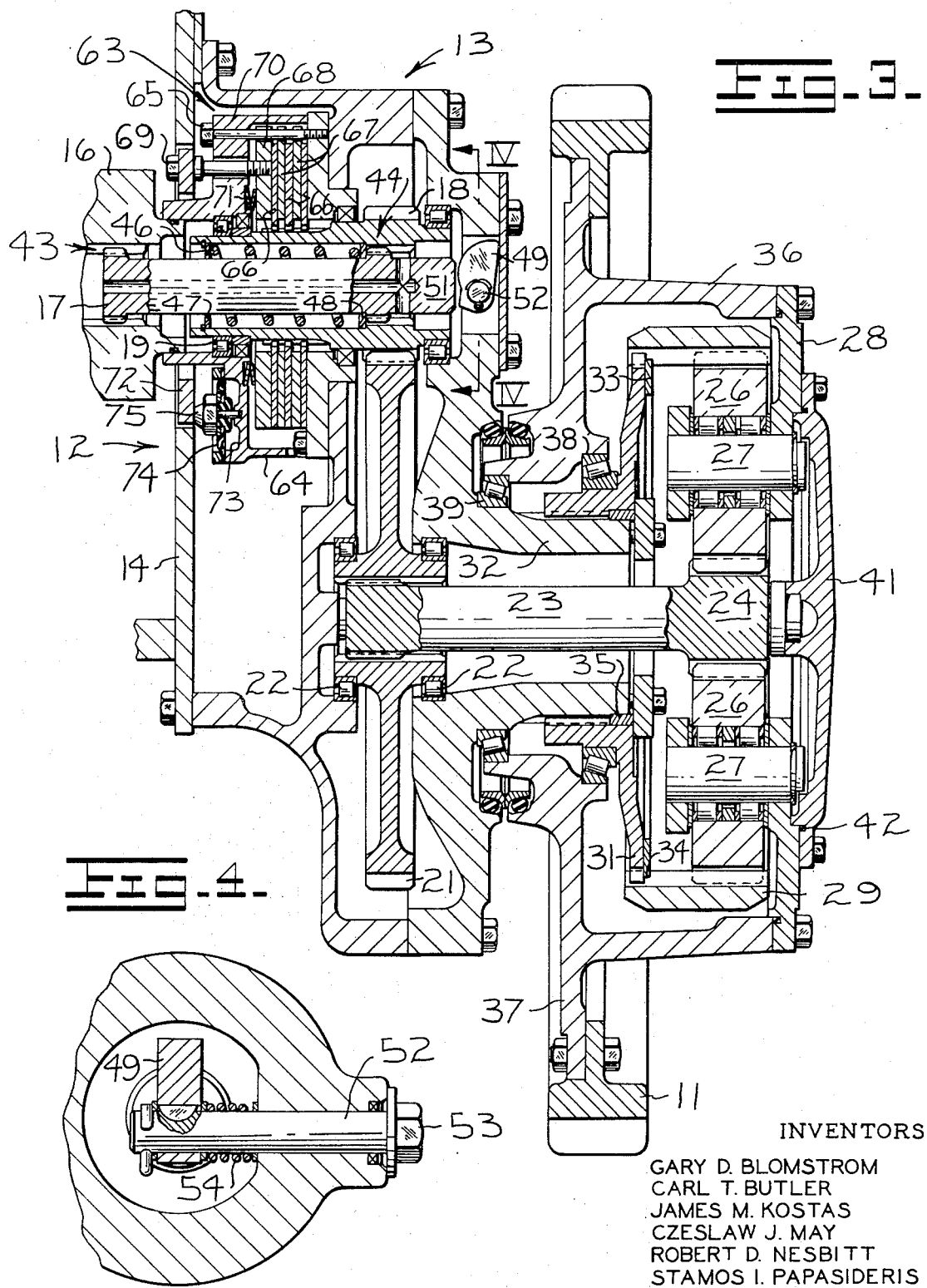

INVENTORS
GARY D. BLOMSTROM
CARL T. BUTLER
JAMES M. KOSTAS
CZESLAW J. MAY
ROBERT D. NESBITT
STAMOS I. PAPASIDERIS

BY
Fryer, Tjensvold, Feix, Phillips & Lempio
ATTORNEYS

FINAL DRIVE DECOUPLING AND PARKING BRAKE ARRANGEMENT FOR HYDROSTATIC LOADER

BACKGROUND OF THE INVENTION

Hydrostatic drives are variously employed for the transmission of power in numerous mechanisms such as winches, scraper elevators, and loaders. For example, in a hydrostatic drive loader, each track is driven by a separate motor coupled by reduction gearing to a track driving sprocket. Steering, braking, and vehicle speed is achieved through the hydraulic pumps and drive motors which replace the conventional transmission, brakes, and steering clutches.

One of the problems encountered with hydrostatic drive vehicles is that should it become necessary to tow the vehicle, there are no clutches or transmissions with which the drive to the tracks can be decoupled. Towing the vehicle with the hydraulic motor coupled to the final drive would result in severe damage to the motor and/or pump.

Another problem encountered with hydrostatic drive vehicles is that since the primary braking of the vehicle is accomplished with the hydraulic motors, other means must be provided for emergency and/or parking brakes. It is of course desirable that such brake means be provided in as small a package as possible. Similar problems to those posed above with respect to hydrostatic drive loaders and other vehicles are encountered with the hydrostatic drives of other mechanisms with regard to the decoupling of the hydraulic motor and emergency braking of the drive.

SUMMARY OF THE INVENTION

The general object of the present invention is to provide a hydrostatic final drive for a loader, or the like, characterized by a simple conveniently disconnectable mechanism for coupling the hydraulic motor to the reduction gearing of the drive, and compact low torque parking and/or emergency braking means operably associated with the input side of the gear drive.

In the accomplishment of the foregoing and other objects and advantages of the invention there is generally provided a hydrostatic drive including a double reduction gear train, preferably provided with planetary gearing at the output side thereof, coupling a hydraulic motor at the input side of the train to a rotary drive member at the output side, such as a track driving sprocket of a loader. The motor is coupled to an input gear of the first reduction unit of the train by means of a quill shaft spline connected at its opposite ends to the motor and gear.

In accordance with a particularly important aspect of the invention, means are provided for manually translating the quill shaft to disengage the spline connection at one of its ends, thereby decoupling the motor from the gear drive. In one embodiment of the disconnect means a jack bolt threaded through a tapped bore of a housing enclosing the gear train is rotatably coaxially secured to the end of the quill shaft adjacent the input gear to normally retain the shaft in engaged position with the motor and gear. Unscrewing of the bolt translates the shaft to disengage the splined connection between the shaft and input gear.

In another embodiment of the disconnect means, the quill shaft is spring loaded into normally engaged position with the motor and gear, and a manually rotatable cam engaging the end of the shaft adjacent the gear may be rotated to translate the shaft against the loading of the spring and thereby disengage the splined connection between the shaft and gear.

In accordance with another particularly important aspect of the invention, brake means are coupled to the input reduction unit of the train for selectively locking same against rotation, the braking force required being relatively low and thus the brake package relatively small, since the greater multiplication of torque occurs in the output planetary reduction unit. In one embodiment, the brake means are coaxially disposed about the disconnectable quill shaft to selectively apply braking torque to the input gear of the input reduction unit. In another embodiment, the brake means are coupled to the output gear of the input reduction unit to selectively apply braking torque thereto. In either case, locking of the input reduction unit locks the entire gear train and thus the output track driving sprocket. The brake means are arranged to be selectively releasable or disconnectable from the input reduction unit to free the tram for free wheeling movement.

BRIEF DESCRIPTION OF THE DRAWINGS

FIG. 3 is a sectional view taken at line 3—3 of FIG. 1.

FIG. 4 is a sectional view taken at line 4—4 of FIG. 3.

DETAILED DESCRIPTION OF PREFERRED EMBODIMENTS OF THE INVENTION

Figure 1:
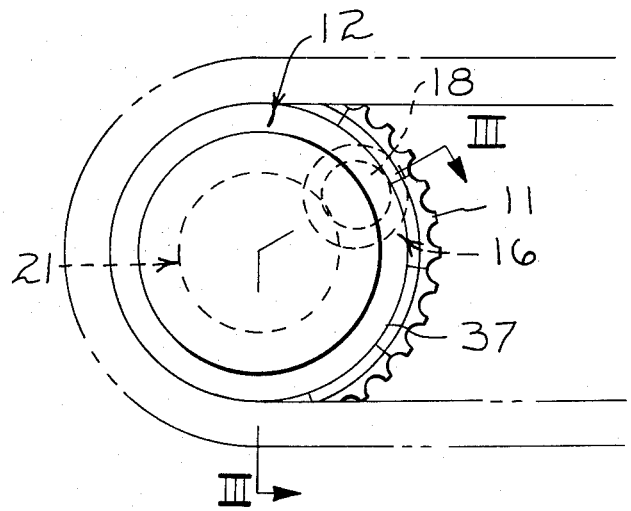
FIG. 1 is a fragmentary side elevational view depicting a portion of the track driving means of a hydrostatic drive loader embodying drive decoupling and braking means in accordance with the present invention.
Figure 2:
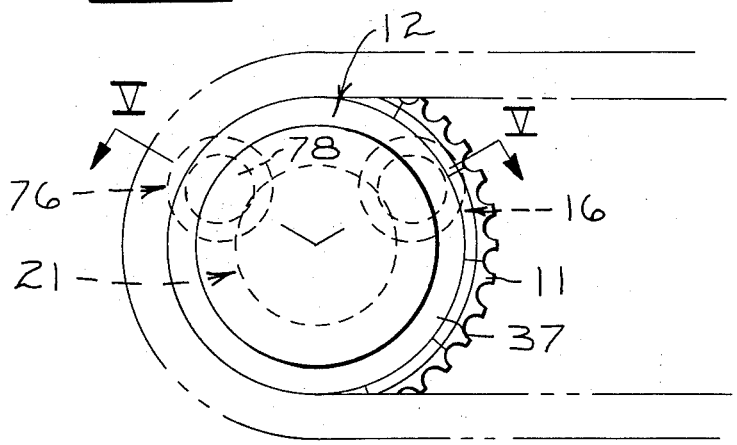
FIG. 2 is a view similar to FIG. 1, but depicting a modified form of the invention.

Referring now to the drawings in detail, particularly FIGS. 1 and 3, the invention will be seen to be illustrated with respect to a substantially conventional hydrostatic track driving means of a track-type loader which includes a track driving sprocket 11 adapted to be driven by a hydraulically powered double reduction final drive assembly 12.

Basically, the drive assembly includes a housing 13 rigidly secured to a main frame partially shown at 14. Driving power is directed from a hydraulic motor 16, secured to frame 14, through a quill shaft 17 to a pinion 18 coupled thereto and rotatably mounted within bearings 19 for driving engagement with a larger gear 21, the pinion 18 and gear 21 comprising the input and output gears of a first or input reduction unit of a gear drive train. Gear 21 is suitably rotatably mounted within housing 13 by means of bearings 22 and non-rotatably secured to a drive shaft 23 having its opposite end formed as a sun gear 24.

The sun gear 24 is part of a planetary gear drive which comprises the second or output reduction unit of the drive train. More particularly, the sun gear meshingly engages a plurality of circumferentially spaced planet gears 26 carried by pins 27 supported by a planet carrier member 28. Each of the planet gears also meshes with an internal ring gear 29 secured to a stationary member 31 splined to a spindle 32 which is an integral part of housing 13. The ring gear 29 is secured to member 31 by plates 33 which are bolted thereto and extend into notches 34 in the ring gear. Both the sun gear and ring gear are mounted for radial float.

The carrier member 28 has its peripheral edges rigidly secured to the outer end of a hollow hub 36 having at its inner end a radially outwardly projecting flange 37 to which the sprocket 11 is secured. Thus, when the sun gear 24 is driven by rotation of shaft 23, it causes the planet gears 26 to walk around within the fixed ring gear 29 and thereby rotate the sprocket hub 36 to which the carrier member is secured, at a lesser velocity than the shaft 23.

An annular ring 35 is disposed between member 31 and spindle 32 to provide means to transmit the loads imposed on the hub 36 to the spindle through bearings 38 and 39. A removable cover plate 41 bridging the central opening of the carrier member 28 is provided to facilitate inspection or servicing of the final drive gearing. Suitable seals 42 are provided to prevent entry of dirt and water.

With the hydrostatic drive assembly 12 outlined hereinbefore, it will be appreciated that there are no clutches or transmissions with which the gear drive train between the hydraulic motor 16 and sprocket 11 can be decoupled to prevent damage to the motor in situations where the vehicle must be towed with the motor inoperable. However, this difficulty is overcome in accordance with the present invention by the provision of a disconnectable mechanism coupling the hydraulic motor 16 to the input gear 18 of the reduction gear train.

As previously noted quill shaft 17 directs power from motor 16 to the input pinion gear 18. In this regard, the gear 18 is of elongated hollow cylindrical configuration and the quill shaft is coaxially disposed therein. One end of the quill shaft is spline connected to the motor as indicated at 43, and the opposite end of the shaft is spline connected to the gear as indicated at 44. In accordance with the broader aspects of the disconnectable mechanism of the present invention, means are provided to manually longitudinally translate the quill shaft to disengage the spline connection 44.

More particularly, in the embodiment depicted in FIGS. 3 and 4, a spring 46 is coaxially disposed about shaft 17 and acts between a retaining ring 47 projecting radially inward from the bore wall of the gear and a retaining ring 48 projecting radially outward from the shaft adjacent spline connection 44 to thereby resiliently urge the shaft into a normal coupled position.

Disengagement of the spline connection is then accomplished by means of a cam 49 which is rotatable into engagement with an end tip portion 51 of the shaft projecting from the distal end of the gear bore with respect to the motor. In this regard cam rotation in the counterclockwise direction, as viewed in FIG. 3, forces the shaft leftward against the force of spring 46 to disengage the spline connection 44, and in an over-center position holds the shaft in the disengaged position.

The cam 49 is keyed to a transverse shaft 52 which extends exteriorly through the side of the housing 13 and is provided with a hex head 53 at its exterior end at a location where it can be readily turned with a wrench. A compression spring 54 coaxially disposed about shaft 52 and acting between the cam and interior of the housing serves to resiliently restrain shaft rotation. Thus, when the shaft 52 is turned by means of a wrench engaging the hex head 53 the cam is rotated to translate the quill shaft 17 to a disengaged position, thus allowing the final drive to be free-wheeling when the vehicle is towed and preventing damage to the hydraulic motor.

To re-engage the spline connection 44, the cam is rotated clockwise to the original position and the spring 46 forces the quill shaft 17 rightwardly. If the splines are misaligned, the hydraulic motor 16 can be rotated slightly, by manipulating the machine controls, and the spring will shift the quill shaft to the engaged position when alignment of the spline connections is achieved.

Figure 5:
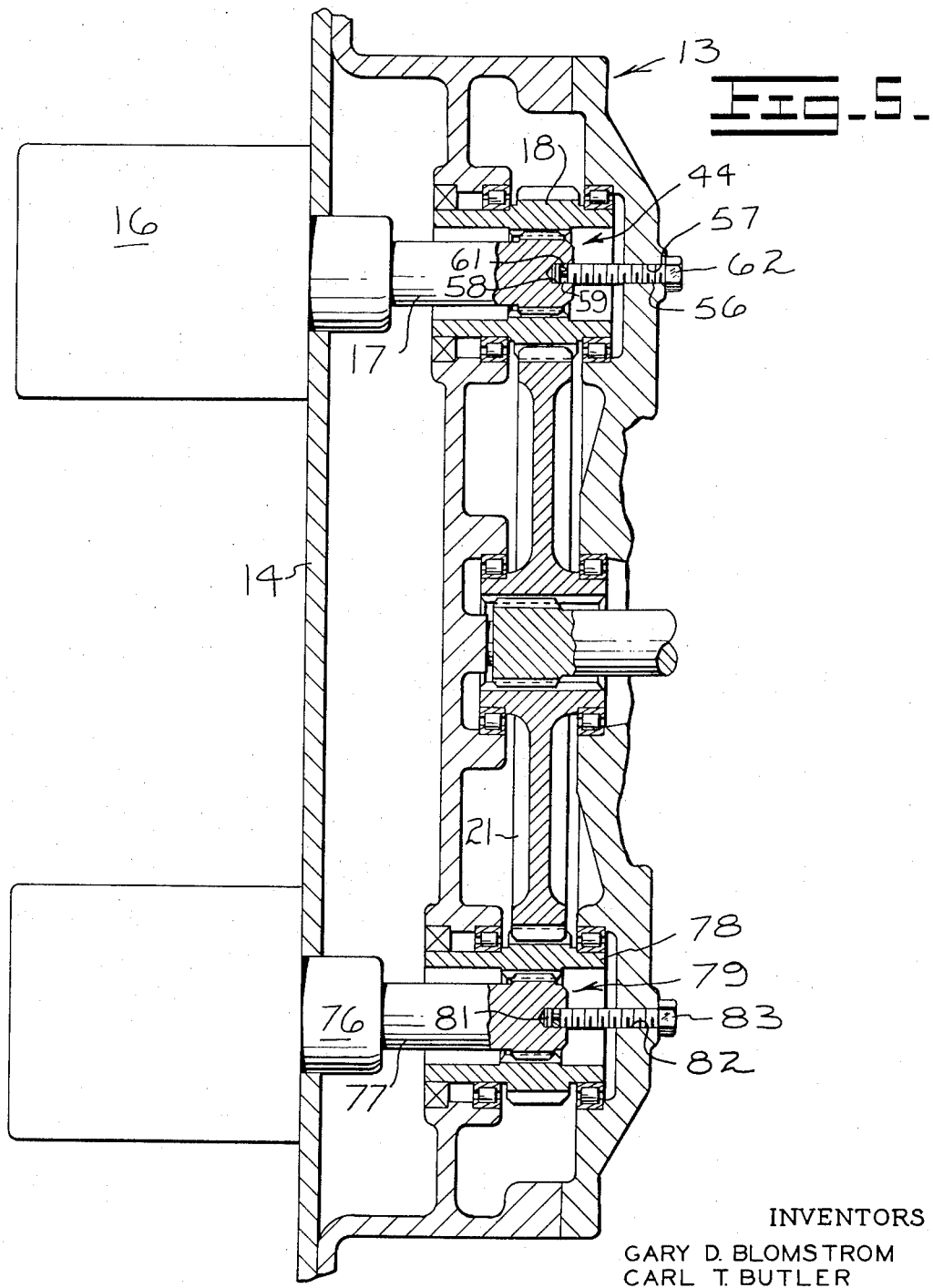
FIG. 5 is a sectional view taken at line 5—5 of FIG. 2.

Considering now an alternative form of disconnectable mechanism in accordance with the present invention for decoupling the hydraulic motor 16 from the input gear 18 of the drive train, reference is made to FIG. 5. As shown therein, the end of quill shaft 17 adjacent spline connection 44 is rotatably coaxially secured to a jack bolt 56 threaded through a tapped bore 57 in a front wall of housing 13 inwardly spaced from sprocket hub 36. More particularly, the tip end of the bolt is rotatably received in a coaxial cylindrical recess 58 formed in the end face of the quill shaft. The tip end of the bolt is provided with a circumferential groove 59 which is freely traversed by a transverse pin 61 secured across the recess wall to restrain longitudinal translation of the bolt relative to the shaft while permitting rotation therebetween. The exterior end of the bolt is provided with a hex head 62 which may be engaged with a wrench to facilitate unscrewing of the bolt. Unscrewing of the bolt effects rightward translation of the quill shaft (as viewed in FIG. 5) to thereby disengage the spline connection 44 between the shaft and input gear 18.

Since primary braking in a hydrostatic drive system of the type described hereinbefore is accomplished with the hydraulic drive motors, other means must be provided for parking and/or emergency brakes. It is desirable that the required braking torque be as small as possible in order that the brake means may be made compact. Thus in accordance with the present invention brake means are coupled to the input reduction unit of the gear drive train to selectively lock the entire train against rotation. In this regard, since the greater multiplication of torque occurs in the output planetary reduction unit, the braking torque required to stop the input reduction unit is relatively low.

As shown in FIG. 3, the brake means may advantageously comprise a spring applied hydraulically released parking brake 63 disposed within a brake housing 64 coaxially disposed about the quill shaft 17 and coaxial input gear 18 to selectively apply braking torque to the latter. The brake housing 64 is secured to the housing 13 by bolts 65. The brake includes a first set of friction-faced disks 66 coaxially secured to the input gear 18 to rotate therewith and a second set of coaxial contact disks 67 interleaved with disks 66 and which have their outer peripheries notched to register with bolts 65 to prevent rotation of disks 67. The disks 66 and disks 67 are both free to move axially. A pressure plate 68 disposed adjacent to one of the friction-faced disks 66 is secured to longitudinal guide rods 69 which slidably traverse bores extending through an end wall 70 of the brake housing.

A plurality of compression springs 71 are provided to act longitudinally between end wall 70 and pressure plate 68 thereby normally urging disks 66 into frictional engagement with disks 67 and applying braking torque to the gear 18. The guide rods 69 are secured to an end plate 72 disposed exteriorly of end wall 70. The end wall 70 is formed with a plurality of chambers 73, each of which faces a flexible diaphragm 74 which in turn has a piston 75 secured thereto in abutting engagement with the end plate 72. The chambers 73 are communicated by conduit means (not shown) with the hydraulic system of the vehicle such that under normal running conditions hydraulic pressure is supplied to the chambers. The pressure acts upon diaphragms 74 to flex same, moving the piston 75 outwardly and thereby urge the end plate 72 and plate 68 secured thereto against the loading force of springs 71. As a result, the brake is released when the vehicle is operated under normal running conditions. In the event of shut down or failure of the hydraulic system, hydraulic pressure in chambers 73 is terminated whereupon the springs 71 effect application of the brake to thereby lock the input gear 18, and therefore the entire gear drive train to the sprocket 11.

In the event it is necessary to tow the vehicle and the gear train has been decoupled from the hydraulic motor 16 in the manner previously described, it is of course necessary to release the brake 63 in order to free the drive for free running operation. Such release of the brake may be advantageously effected by means of a hand pump and associated valving (not shown) which are accessible to the operator and communicably coupled to chambers 73. Manipulation of the hand pump applies hydraulic pressure to the chambers to release the brake under such circumstances.

An alternative form of brake means is shown in FIG. 5 which is generally similar to that described above except in its point of application to the gear drive train. More particularly, in the alternative design a spring applied hydraulically released parking brake 76 is mounted upon frame 14 and coupled by means of a shaft 77 to a pinion gear 78 which meshes with the output gear 21 of the input reduction unit of the drive train. The brake 76 is similar in construction to brake 63 and therefore not described in detail herein, it sufficing to state that brake 76 is arranged to act upon shaft 77 in the same manner as brake 63 acts upon gear 18.

Brake 76 is hydraulically released responsive to the pressure existing in the hydraulic system of the vehicle under normal running conditions thereof. Shaft 77 and gear 78 are thus freed for rotation with gear 21 such that the entire gear train is in an unlocked condition. Upon shut down or failure of the hydraulic system spring applied braking torque is exerted on shaft 77 and gear 78. The braked gear 78 thus locks gear 21, and therefore the entire drive train.

It will be appreciated that with the brake 76, there still exists the problem of releasing or decoupling of the brake to permit towing of the vehicle. Such release of the brake may be effected by means of a hand pump as in the case of brake 63. However, brake decoupling may be accomplished in a simplified manner by providing shaft 77 as a quill shaft coupled to gear 78 by means of a spline connection 79, and providing means for manually longitudinally translating the quill shaft to disengage such spline connection in the same manner as employed with quill shaft 17 to decouple motor 16 from input gear 18. In this regard, the end of quill shaft 77 adjacent spline connection 79 may be rotatably coaxially secured to a jack bolt 81 threaded through a tapped bore 82 in a front wall of housing 13, in the same manner as jack bolt 56 associated with quill shaft 17. The exterior end of the bolt is provided with a hex head 83 which may be engaged with a wrench to facilitate unscrewing of the bolt. Unscrewing of the bolt effects rightward translation of quill shaft 77 to thereby disengage the spline connection 79 between the shaft and gear 78. The entire gear drive train is thus decoupled from brake 76 to permit towing of the vehicle. It will be appreciated that in place of the jack bolt 81, a cam arrangement of the variety previously described with respect to the embodiment of FIGS. 3 and 4 may be employed to effect disengaging translation of the quill shaft 77.

Although the invention has been hereinbefore described and illustrated in the accompanying drawings with respect to several preferred embodiments, it will be appreciated that various changes and modifications may be made therein without departing from the true spirit and scope of the invention, and thus it is not intended to limit the invention except by the terms of the appended claims.

What is claimed is:

1. In a hydrostatic drive including a reduction gear train having an input reduction unit with an internally splined input gear, and hydraulic motor means for coupling to said internally splined input gear in driving relationship thereto, said hydraulic motor means having an internally splined output connection member, the combination comprising a quill shaft having a circular cross sectional configuration with a hollow axially extending interior portion and having first and second externally disposed axially spaced-apart splines at opposite ends thereof and said quill shaft being spline connected at said opposite ends to respectively said internally splined motor output connection member and said internally splined input gear, said quill shaft being longitudinally translatable between a first position wherein said second spline is engaged with said internally splined input gear and a second position wherein at least one of said first and second splines is disengaged from one of said internally splined output connection member or said internally splined input gear, means for physically translating said quill shaft between said first and second positions, said internally splined input gear also having externally disposed brake connection means, and brake means for directly applying braking force to said externally disposed connection means and to said input reduction unit to lock said input reduction unit against rotation.

2. The combination of claim 1, further defined by means longitudinally spring loading said quill shaft into said first position, and means including a rotatable cam directly engaging an end of said quill shaft for urging same against the spring loading force into said second position upon rotation of said cam.

3. The combination of claim 2, further defined by a shaft secured to said cam for rotating same extending through a wall of a housing enclosing said gear train, said shaft having a head at its external end for rotation by a tool.

4. The combination of claim 1, further defined by a jack bolt threaded through a wall of a housing enclosing said gear train, said jack bolt rotatably coaxially secured to an end of said quill shaft to normally longitudinally retain same in said first position, said jack bolt longitudinally translating said quill shaft to said second position responsive to unscrewing of said jack bolt.

5. The combination of claim 4, further defined by said end of said quill shaft having a recess rotatably receiving the tip end of said jack bolt, said tip end of said bolt jack having a circumferential groove, and a transverse pin secured across the wall of said recess and freely traversing said groove.

6. The combination of claim 1, further defined by said brake means comprising a spring applied hydraulically released brake.

7. The combination of claim 6, further defined by said brake being coupled to an output gear of said input reduction unit to selectively apply braking torque thereto.

8. The combination of claim 1, further defined by said brake comprising a first plurality of disks coaxially secured to said internally splined input gear, a second plurality of disks coaxially disposed with respect to said internally splined input gear and interleaved with said first plurality of disks, a brake housing enclosing said disks, loading springs acting between said brake housing and said second plurality of disks to normally resiliently urge same into frictional engagement with said first plurality of disks, and hydraulically actuated means carried by said brake housing and coupled to said second plurality of disks to urge same against the force of said springs to disengage said second plurality of disks from said first plurality of disks responsive to hydraulic pressure.

9. The combination of claim 7, further defined by a braking gear meshed with said output gear, and a second shaft coupled to said braking gear, said brake coupled to said second shaft to selectively apply braking torque thereto.

10. The combination of claim 9, further defined by said second shaft being a quill shaft spline connected to said braking gear, said second shaft being longitudinally translatable between a first position wherein the spline connection thereof is engaged and a second position wherein the spline connection thereof is disengaged, and means for manually longitudinally translating said second shaft between said first and second positions thereof.

11. The hydrostatic drive of claim 1 in a loader and further comprising a planetary output reduction unit in driving relation to a track driving sprocket, and a spring applied hydraulically released brake means coupled to said input reduction unit for selectively applying braking torque thereto.

12. The invention of claim 13, further defined by means longitudinally spring loaded said quill shaft into said first position, a rotatable cam engaging an end of said quill shaft for urging same against the spring loading force upon cam rotation, said cam being rotatable between a first position wherein said shaft is in said first position thereof and a second position wherein said cam holds said shaft in said second position thereof, and a second shaft secured to said cam to impart rotation thereto, said second shaft extending through a wall of a housing enclosing said gear train and having a head at its external end for engagement by a wrench.

13. The invention of claim 13, further defined by a jack bolt threaded through a wall of a housing enclosing said gear train, said bolt rotatably coaxially secured to an end of said shaft to normally longitudinally retain same in said first position, said bolt longitudinally translating said shaft to said second position responsive to unscrewing of said bolt.

14. The invention of claim 13, further defined by said brake comprising a first plurality of disks coaxially secured to said input gear, a second plurality of disks coaxially disposed with respect to said input gear and interleaved with said first plurality of disks, a brake housing enclosing said disks, loading springs acting between said brake housing and said second plurality of disks to normally resiliently urge same into frictional engagement with said first plurality of disks, and hydraulically actuated means carried by said brake housing and coupled to said second plurality of disks to urge same against the force of said springs to disengage said second plurality of disks from said first plurality of disks responsive to hydraulic pressure.

15. The invention of claim 14, further defined by means longitudinally spring loading said quill shaft into said first position, a rotatable cam engaging an end of said shaft for urging same against the spring loading force upon cam rotation, said cam being rotatable between a first position wherein said shaft is in said first position thereof and a second position wherein said cam holds said shaft in said second position thereof, and a second shaft secured to said cam to impart rotation thereto, said second shaft extending through a wall of a housing enclosing said gear train and having a head at its external end for engagement by a wrench.

16. The invention of claim 14, further defined by a jack bolt threaded through a wall of a housing enclosing said gear train, said bolt rotatably coaxially secured to an end of said quill shaft to normally longitudinally retain same in said first position, said bolt longitudinally translating said shaft to said second position responsive to unscrewing of said bolt.

17. The invention of claim 11, further defined by said braking means acting upon said input reduction unit second shaft coupled to said braking means, said braking means coupled to said second shaft to selectively apply braking torque thereto.

18. The invention of claim 17, further defined by means longitudinally spring loading said quill shaft into said first position thereof, a rotatable cam engaging an end of said first shaft for urging same against the spring loading force upon cam rotation, said cam rotatable between a first position wherein said quill shaft is in said first position thereof and a second position wherein said cam holds said quill shaft in said second position thereof, and a third shaft secured to said cam to impart rotation thereto, said third shaft extending through a wall of a housing enclosing said gear train and having a head at its external end for engagement by a wrench.

19. The invention of claim 17, further defined by a jack bolt threaded through a wall of a housing enclosing said gear train, said bolt rotatably coaxially secured to an end of said quill shaft to normally longitudinally retain same in said first position, said bolt longitudinally translating said first shaft to said second position thereof responsive to unscrewing of said bolt.

20. The invention of claim 17, further defined by said second shaft being a quill shaft spline connected to said braking means, said second shaft being longitudinally translatable between a first position wherein the spline connection thereof is engaged and a second position wherein the spline connection thereof is disengaged, and means for manually longitudinally translating said second shaft between said first and second positions thereof.

21. The invention of claim 20, further defined by means longitudinally spring loading said quill shaft into said first position thereof, a rotatable cam engaging an end of said quill shaft for urging same against the spring loading force upon cam rotation, said cam rotatable between a first position wherein said quill shaft is in said first position thereof and a second position wherein said cam holds said quill shaft in said second position thereof, and a third shaft secured to said cam to impart rotation thereto, said third shaft extending through a wall of a housing enclosing said gear train and having a head at its external end for engagement by a wrench.

22. The invention of claim 21, further defined by a jack bolt threaded through a wall of said housing enclosing said gear train, said jack bolt rotatably coaxially secured to an end of said second shaft to normally longitudinally retain same in said first position thereof, said second bolt longitudinally translating said second shaft to said second position thereof responsive to unscrewing of said second bolt.

23. The invention of claim 20, further defined by a jack bolt threaded through a wall of a housing enclosing said gear train, said bolt rotatably coaxially secured to an end of said quill shaft to normally longitudinally retain same in said first position, said bolt longitudinally translating said quill shaft to said second position thereof responsive to unscrewing of said bolt.

24. The invention of claim 23, further defined by a second jack bolt threaded through a wall of said housing enclosing said gear train, said second bolt rotatably coaxially secured to an end of said second shaft to normally longitudinally retain same in said first position thereof, said second bolt longitudinally translating said second shaft to said second position thereof responsive to unscrewing of said second bolt.

* * * * *